(12) United States Patent
Kaplan et al.

(10) Patent No.: US 6,313,234 B1
(45) Date of Patent: Nov. 6, 2001

(54) COATING SYSTEM SETTABLE BY HEAT

(75) Inventors: Andreas Kaplan; Manfred Hoppe; Eberhard Kinkelin, all of Chur (CH)

(73) Assignee: EMS Inventa-AG, Zurich (CH)

( * ) Notice: Subject to any disclaimer, the term of this patent is extended or adjusted under 35 U.S.C. 154(b) by 0 days.

(21) Appl. No.: 08/469,171

(22) Filed: Jun. 6, 1995

Related U.S. Application Data

(62) Division of application No. 08/215,787, filed on Mar. 22, 1994, now abandoned.

(30) Foreign Application Priority Data

Jan. 19, 1994 (DE) ................................................ 44 01 438

(51) Int. Cl.$^7$ ..................................................... C08F 20/00
(52) U.S. Cl. ...................... 525/437; 525/444; 525/448; 525/934; 528/272; 528/291; 528/292
(58) Field of Search ................................. 525/437, 444, 525/448, 934; 528/272, 291, 292

(56) References Cited

U.S. PATENT DOCUMENTS

| | | | |
|---|---|---|---|
| 3,723,572 | * 3/1973 | Reese et al. | 525/444 |
| 4,065,438 | * 12/1977 | Verborgt | 525/438 |
| 4,140,728 | 2/1979 | Hahn et al. | 260/835 |
| 4,340,698 | 7/1982 | DeJongh et al. | 525/438 |
| 4,471,108 | 9/1984 | Belder et al. | 528/272 |
| 4,525,504 | * 6/1985 | Morris et al. | 525/437 |
| 4,910,257 | * 3/1990 | McLafferty et al. | 525/437 |
| 4,933,429 | 6/1990 | McCracken et al. | 528/272 |
| 4,997,907 | 3/1991 | Marten et al. | 528/272 |
| 4,999,388 | 3/1991 | Okamoto | 523/400 |
| 5,006,612 | 4/1991 | Danick et al. | 525/438 |
| 5,097,006 | * 3/1992 | Kapilow et al. | 525/437 |
| 5,245,003 | 9/1993 | Johnson | 528/272 |
| 5,250,634 | 10/1993 | Toyoda et al. | 525/438 |
| 5,262,510 | 11/1993 | Kwon et al. | 528/112 |
| 5,266,657 | * 11/1993 | Hammerton et al. | 525/437 |
| 5,321,100 | 6/1994 | Belder et al. | 525/438 |
| 5,326,832 | * 7/1994 | Belder et al. | 525/438 |
| 5,342,893 | * 8/1994 | Wilkinson et al. | 525/177 |
| 5,350,810 | * 9/1994 | Degraaf et al. | 525/444 |

FOREIGN PATENT DOCUMENTS

| | | |
|---|---|---|
| 37 40 932 | 6/1989 | (DE) . |
| 0 322 834 | 7/1989 | (EP) . |
| 2 033 946 | 12/1970 | (FR) . |
| 2 339 635 | 8/1977 | (FR) . |
| 1 249 271 | 10/1971 | (GB) . |
| 1 529 422 | 10/1978 | (GB) . |
| WO91/14745 | 10/1991 | (WO) . |

OTHER PUBLICATIONS

L.C.E. Struik, Physical Aging in Amorphous Polymers and Other Material, Elsevier Scientific Publishing Company, pp. 1–19 (1978).

Ir. Pieter Jan Greidanus, "Physical Aging of Thermoset Coatings," pp. 485–496.

Dan Y. Perera et al., "Effect of Physical Aging on Thermal Stress Development in Powder Coatings," XIXth International Conference in Organic Coatings Science and technology, (Jul. 12–16, 1993), Athens, Greece, pp. 417–427.

Houben–Weyl, *Methoden der organischen Chemie* [Organic Chemical Processes] publication, and English language translation.

* cited by examiner

*Primary Examiner*—Randy Gulakowski
(74) *Attorney, Agent, or Firm*—Marina V Schneller; Venable

(57) ABSTRACT

A heat settable, coating system of carboxyl-functional polyester resins, polyfunctional epoxy compounds and/or β-hydroxy alkyl amides, as well as further customary additives, if required. The coating system contains at least one linear carboxyl-functional polyester resin of up to 10 mol-part of isophthalic acid and at least 90 mol-parts of at least a further dicarboxylic acid from the group of aromatic dicarboxylic acids with 8 to 16 C-atoms, aliphatic dicarboxylic acids with 6 to 22 C-atoms and cycloaliphatic dicarboxylic acids with 8 to 16 C-atoms, and at least 90 mol-parts of at least one branched aliphatic diol with 4 to 12 C-atoms, and up to 50 mol-parts of at least one linear aliphatic diol with 2 to 22 C-atoms and/or at least one cycloaliphatic diol with 6 to 16 C-atoms as the binder resin. Also a process for producing thermosetting coating systems of carboxyl-functional polyester resins, wherein binder resin, at least one cross-linking agent from the group of polyfunctional epoxy compounds and β-hydroxy alkyl amides and, if required, further customary additives are mixed into the melt at 90 to 130° C., extruded, removed, granulated, comminuted and screened to a size of less than 100 μm. Finally, uses of the thermosetting coating system and of a protective layer produced from this coating system.

15 Claims, No Drawings

COATING SYSTEM SETTABLE BY HEAT

This is a Division of application Ser. No. 08/215,787 filed Mar. 22, 1994, now abandoned.

FIELD OF THE INVENTION

The invention relates to coating systems settable by heat on the basis of linear carboxyl-functional polyester (PES) resins and polyfunctional epoxy compounds and/or β-hydroxy alkyl amides, their production and use, as well as protective coatings made of these coating systems.

TECHNOLOGY REVIEW

In general, thermosetting coating systems consist of a binder resin and a cross-linking agent, pigments and additives and/or fillers. Cross-linking and thus setting under heat takes place by means of polyaddition or polycondensation reactions between functional groups contained in the binder systems. Epoxy resin/hardener, polyester/epoxide, polyester/isocyanate, polyester/β-hydroxyl alkyl amide, acrylate/isocyanate are typical binder systems.

The macroscopic properties of hardened powder coating films change over time. This phenomenon in polymeric materials has been known for some time by the term physical aging (L.C.E. Struik: Physical Aging in Amorphous Polymers and Other Materials, Elsevier, Publ., 1978).

Physical aging is understood to be the change over time of the macroscopic properties of polymers in the glass state under constant ambient conditions, caused by a lack of an equilibrium state in the polymers. Physical aging is reversible, in contrast to chemical aging, wherein irreversible changes in the material occur, such as decomposition reactions or chain breaks, caused by thermal decomposition or photo-oxidation.

Examples of changes through physical aging are changes in the electrical and optical characteristic values as well as changes in mechanical properties, which are the most important for coating films. Although generally known in connection with coating films, up to now this phenomenon did not appear to present too great problems.

This phenomenon and the means to overcome it have created more interest because of the increased employment of organic pigments and the high demands made on powder coatings by the precoating metal and coil coating methods, particularly if the coated parts are post-formed. Transparent coatings used as protective layers against crack formation constitute another field of application of interest for powder coatings having increased resistance to physical aging.

In the previously mentioned book "Physical Aging in Amorphous Polymers and Other Materials", L.C.E. Struik generally describes the phenomenon of physical aging by the example of polymers. To-date there are few references in the literature addressing the phenomenon of physical aging of organic coatings or, in particular, powder coatings.

Only the fundamental physical principles and the effects of physical aging are measured and described, however, no solution of this problems is proposed.

With powder coatings on the basis of carboxyl-functional polyesters and polyepoxides and/or β-hydroxyl alkyl amides as cross-linking agents, the phenomenon of physical aging can be forced back by increasing the curing temperature, by increasing the curing time, by an excess of cross-linking agent or by the installation of so-called branchers, i.e. acids or alcohols of a functionality greater than 2, in the basic polyester resin. An increase in the curing temperature or an extension of the curing time is connected with increased energy consumption and partially also with color changes. An excess of cross-linking agent must also be rejected from an economical point of view and is connected with increased costs. The installation of branchers in the polyester resin cannot be recommended from a technical viewpoint, since it is connected with a deterioration of the film leveling properties.

SUMMARY OF THE INVENTION

Thus, the object on which the invention is based is to overcome the above mentioned disadvantages of the prior art.

In particular, the object is attained by a coating system of carboxyl-functional polyester resins made of linear monomeric structural elements and cross-linking agents, wherein isophthalic acid constitutes maximally 10 mol-parts of all structural acid elements.

DETAILED DESCRIPTION OF THE INVENTION

It was noted that it was possible in a surprising manner to obtain a clear improvement of the resistance to physical aging of powder coatings on the basis of linear carboxyl-functional polyester, i.e. those in which the functionality of the acids and alcohols used is less than or equal to 2, and polyfunctional epoxides and/or β-hydroxy alkyl amides as cross-linking agents or hardeners.

Thus, the thermosetting coating system of the invention consists of a specific saturated polyester as binder resin a), which is distinguished in a particular way in that it is constructed from aliphatic and/or cyclo-aliphatic diols and aliphatic and/or cyclo-aliphatic and/or aromatic dicarboxylic acids, wherein the amount of isophthalic acid is less than 10 mol-parts referring to the entire amount of acid.

The carboxyl-functional polyester resin a) minimally contains 90 mol-parts of other aromatic, aliphatic or cyclo-aliphatic dicarboxylic acids, wherein terephthalic acid is preferred as the aromatic dicarboxylic acid, adipic acid, azelaic acid, sebacic acid and dodecane dicarboxylic acid as the aliphatic, or cyclohexane dicarboxylic acid as the cyclo-aliphatic dicarboxylic acid. In a preferred embodiment the polyester resins are made of 3 to 9 mol-parts of aliphatic dicarboxylic acid with at least 6 C-atoms, wherein adipic acid is particularly preferred, and/or 3 to 9 mol-parts of cyclo-aliphatic dicarboxylic acid, wherein 1,4-cyclohexane dicarboxylic acid is particularly preferred.

The diols of the polyester resin consist of at least 50 mol-parts of at least one branched aliphatic diol with 4 to 12 C-atoms, as well as maximally 50 mol-parts of at least one linear aliphatic diol with 2 to 22 C-atoms and at least one cyclo-aliphatic diol with 6 to 16 C-atoms, wherein 2,2-dimethyl-1,3-propane diol is preferred as the branched diol.

Epoxy compounds with at least two epoxy groups and/or β-hydroxy alkyl amides with at least two hydroxy alkyl amide groups are suitable as a cross-linking component b). Glycidyl ethers of cyanuric or isocyanuric acid or glycidyl esters of polycarboxylic acids are preferred monomeric polyepoxy compounds. Terephtalic acid, trimellitic acid or mixtures thereof are preferred here. Trisglycidyl isocyanuric acid (TGIC) is particularly preferred. Bis[N, N'-di(β-hydroxy-ethyl)]adipamide (Primid XL 552 of the firm Rohm and Haas) is particularly suited as the β-hydroxy alkyl amide compound.

In a preferred embodiment of the coating system, the polyester resin has an acid value of 15 to 100 [mg/KOH/g], an OH value of maximally 10 [mg/KOH/g] and a glass transition temperature $T_g$ of higher than 45° C.

The additives (c) which are customary for producing and using powder coatings can be additionally present in the coating system in accordance with the invention.

These are additives from the group of accelerators, pigments, fillers, leveling and degassing agents, heat, UV and/or HALS stabilizers or tribo-additives as well as matting agents such as waxes, if required.

The production of the carboxyl-functional polyester resins takes place in a known manner by the common heating of all monomeric components in the presence of customary esterification catalysts to a temperature of approximately 250° C. and removal of the reaction water which was generated, or in a two-stage process, wherein in a first stage a hydroxyl-functional polyester is formed in the presence of excess polyol and, in a second stage, it is reacted with one or several polybasic carboxylic acids or their anhydrides to form a carboxyl-functional polyester resin.

The production of the powder coatings of the invention preferably takes place in the melt by the common extrusion of all compound components at temperatures between 90 and 130° C. Subsequently the extrudate is cooled, milled and sieved to a particle size of less than 100 μm. In principle, other processes are also suitable for producing the powder coatings, for example mixing the compound components in solution and subsequent precipitation or removal by distillation of the solvents.

Application of the powder coatings is performed in accordance with the methods customary for powder coatings, for example by means of electrostatic spraying devices such as the corona or tribo system or in accordance with the fluidized bed method.

The powder coatings proposed in accordance with the present invention are sufficiently stable in storage and, after cross-linking at 140 to 200° C., they have very good leveling and mechanical properties. They are further distinguished by good weathering and UV resistance and especially good aging resistance. The production and the properties of the carboxyl-functional, specific polyester resins as well as the powder coatings will be described by way of examples below.

PRODUCTION OF THE CARBOXYL-FUNCTIONAL POLYESTER RESINS

COMPARISON EXAMPLE 391.8 g (3.76 mol) of 2,2-dimethyl-1,3-propanol and 27.5 g (0.44 mol) of ethylene glycol are introduced into a 2 l esterification reactor provided with a temperature sensor, stirrer, reflux column and distillation bridge, and are melted at 140° C. in an inert nitrogen atmosphere which is maintained during the entire reaction.

515.5 g (3.10 mol) of terephthalic acid, 110.5 g (0.67 mol) of isophthalic acid and 0.1 g of an Sn-containing esterification catalyst are added while stirring and the interior temperature is increased in steps to 235° C. The reaction is continued until no more distillate is generated and the acid value is less than 10 mg KOH/g.

Then 73.6 g (0.44 mol) of isophthalic acid and 32.4 g (0.22 mol) of adipic acid are added and esterification is continued until the desired acid value of approximately 33 mg KOH/g is reached. A portion of this second step is performed under reduced pressure (<100 mbar).

EXAMPLE 1

352.9 g (3.39 mol) of 2,2-dimethyl-1,3-propane diol and 56.2 g (0.91 mol) of ethylene glycol are melted in a manner analogous to the comparison example.

639.3 g (3.85 mol) of terephthalic acid and 0.1 g of an Sn-containing esterification catalyst are added while stirring. The reaction is continued until no more distillate is generated and the acid value is less than 10 mg KOH/g.

Then 56.4 g (0.34 mol) of isophthalic acid and 49.6 g (0.34 mol) of adipic acid are added and esterification is continued until the desired acid value of approximately 33 mg KOH/g is reached.

EXAMPLE 2

347.8 g (3.34 mol) of 2,2-dimethyl-1,3-propane diol and 55.4 g (0.89 mol) of ethylene glycol are melted in a manner analogous to the comparison example.

630 g (3.79 mol) of terephthalic acid and 0.1 g of an Sn-containing esterification catalyst are added while stirring. The reaction is continued until no more distillate is generated and the acid value is less than 10 mg KOH/g.

Then 37.1 g (0.22 mol) of isophthalic acid and 32.6 g (0.22 mol) of adipic acid and 38.4 g (0.22 mol) of cyclohexane dicarboxylic acid are added and esterification is continued until the desired acid value of approximately 33 mg KOH/g is reached.

EXAMPLE 3

366.7 g (3.52 mol) of 2,2-dimethyl-1,3-propane diol and 55.7 g (0.90 mol) of ethylene glycol are melted in a manner analogous to the comparison example.

633.7 g (3.82 mol) of terephthalic acid and 0.1 g of an Sn-containing esterification catalyst are added while stirring. The reaction is continued until no more distillate is generated and the acid value is less than 10 mg KOH/g.

Then 55.9 g (0.34 mol) of isophthalic acid and 49.2 g (0.34 mol) of adipic acid are added and esterification is continued until the desired acid value of approximately 22 mg KOH/g is reached.

EXAMPLE 4

364.5 g (3.50 mol) of 2,2-dimethyl-1,3-propane diol and 55.4 g (0.89 mol) of ethylene glycol are melted in a manner analogous to the comparison example.

630 g (3.79 mol) of terephthalic acid and 0.1 g of an Sn-containing esterification catalyst are added while stirring. The continued until no more distillate is generated and the acid value is less than 10 mg KOH/g.

Then 37.1 g (0.22 mol) of isophthalic acid, 32.6 g (0.22 mol) of adipic acid and 38.4 g (0.22 mol) of cyclohexane dicarboxylic acid are added and esterification is continued until the desired acid value of approximately 22 mg KOH/g is reached.

Production of the Powder Coatinqs

The formulation below was used for all powder coatings described in Table 1. DT 3126 of the company Ciba was additionally used as an for the powder coatings in Table 2.

Parts by Weight

| | |
|---|---|
| 948 | Binder |
| 15 | Resiflow PV 88[1) |
| 7 | Benzoin |
| 30 | Organic pigment |

1) Leveling agent on a polyacrylate basis, a commercial product of the firm Worleè-Chemie GmbH The components of the compound are dry-mixed for 30 seconds in a Henschel mixer at 700 rpm and are then extruded in a Buss-Co-Kneader (PLK 46) at a barrel temperature of 100° C., with a cooled screw and at a screw speed of 150 rpm. The extrudate is cooled, milled and sieved to less than 90 μm.

The technical coating tests are performed on aluminum sheets (Q-panel AL-36 5005 H 14/08 (0.8 mm)) at a baking temperature of 180° C. and a baking time of 10 minutes. The thickness of the coating film is approximately 90 μm.

Table 1 shows the changes over time of the impact as a test criterium for the physical aging after storage in a climatized chamber at 23° C. and 50% relative humidity.

Table 2 shows the changes over time of the impact as a test criterium for the physical aging after storage in drying cabinet at 50° C.

TABLE 1

STORAGE IN A CLIMATIZED CHAMBER (23° C./50% RELATIVE HUMIDITY)

| Polyester | Cross-linking agent | Mixture ra+ Ratio CoPES Cross-linking Agent | IMPACT[1] | | | | |
|---|---|---|---|---|---|---|---|
| | | | 0 days | 1 day | 2 days | 7 days | 30 days |
| CoPES from the Comparison Example | Primid XL 552 | 95:5 | >140 | 120 | 80 | 40 | <10 |
| CoPES from Example 1 | Primid XL 552 | 95:5 | >140 | >140 | >140 | >140 | >140 |
| CoPES from Example 2 | Primid XL 552 | 95:5 | >140 | >140 | >140 | >140 | >140 |
| CoPES from Example 3 | Primid XL 552 | 96.5:3.5 | >140 | >140 | >140 | >140 | >140 |
| CoPES from Example 4 | Primid XL 552 | 96.5:3.5 | >140 | >140 | >140 | >140 | >140 |

Reverse impact, ASTM D 2794, ball diameter ⅝" [inch*pound]

TABLE 2

STORAGE IN THE DRYING CHAMBER (50° C.)

| Polyester | DT 3126 in Total Recipe | Cross-linking Agent | Mixture Ratio CoPES Cross-link Agent | IMPACT[1] | | | | | |
|---|---|---|---|---|---|---|---|---|---|
| | | | | 0 Days | 10 Days | 20 Days | 30 Days | 40 Days | 50 Days |
| CoPES from Comparison Example | 0.5 | TGIC | 93:7 | >140 | 100 | 80 | 50 | <10 | <10 |
| | 3.0 | XB 910 | 91.3:8.7 | >140 | 90 | 70 | 30 | <10 | <10 |
| CoPES from Example 1 | 0.5 | TGIC | 93:7 | >140 | >140 | >140 | >140 | >140 | >140 |
| | 3.0 | XB 910 | 91.3:8.7 | >140 | >140 | >140 | >140 | >140 | >140 |
| CoPES from Example 2 | 0.5 | TGIC | 93:7 | >140 | >140 | >140 | >140 | >140 | >140 |
| | 3.0 | XB 910 | 91.3:8.7 | >140 | >140 | >140 | >140 | >140 | >140 |
| CoPES from Example 3 | 0.5 | TGIC | 95:5 | >140 | >140 | >140 | >140 | >140 | >140 |
| | 3.0 | XB 910 | 93.5:6.5 | >140 | >140 | >140 | >140 | >140 | >140 |
| CoPES from Example 4 | 0.5 | TGIC | 95:5 | >140 | >140 | >140 | >140 | >140 | >140 |
| | 3.0 | XB 910 | 93.5:6.5 | >140 | >140 | >140 | >140 | >140 | >140 |

Reverse impact, ASTM D 2794, ball diameter ⅝" [inch*pound]

What is claimed is:

1. A power coating system, comprising:

at least one linear carboxyl-functional polyester binder resin consisting of
from 0.1 to 10 mol-parts of isophthalic acid and
at least 90 mol-parts of at least a further dicarboxylic acid selected from the group consisting of aromatic dicarboxylic acids with 8 to 16 C-atoms, aliphatic dicarboxylic acids with 6 to 22 C-atoms and cycloaliphatic dicarboxylic acids with 8 to 16 C-atoms, and
at least 50 mol-parts of at least one branched aliphatic diol with 4 to 12 C-atoms, and
maximally 50 mol-parts of at least one linear aliphatic diol with 2 to 22 C-atoms and/or at least one cycloaliphatic diol with 6 to 16 C-atoms
as the binder resin, and
a β-hydroxy alkyl amide cross-linking agent, which together form a powder coating system providing powoder coatings which resist physical aging.

2. A coating system in accordance with claim 1, including additives selected from the group consisting of accelerators, pigments, fillers, leveling agents, degassing agents, heat stabilizers, UV stabilizers, flatting agents and triboadditives.

3. The coating system in accordance with claim 1, wherein the cross-linking agent is a β-hydroxy alkyl amide with at least two hydroxy alkyl amide groups.

4. A coating system in accordance with claim 1, wherein the branched aliphatic diol is 2,2-dimethyl-1,3-propane diol.

5. A coating system in accordance with claim 1, wherein the dicarboxylic acid is selected from the group consisting of terephthalic acid, adipic acid, azelaic acid, sebacic acid, dodecane dicarboxylic acid and cyclohexane dicarboxylic acid.

6. A coating system in accordance with claim 1, characterized in that the carboxyl-functional polyester resin has an acid value of 15 to 100 mg/KOH/g and an OH value of maximally 10 mg/KOH/g and a glass transition temperature of higher than 45° C.

7. In a process for producing thermosetting coating systems on the basis of carboxyl-functional polyester resins, the improvement comprising mixing the binder resin, the at least one cross-linking agent from the group of polyfunctional epoxy compounds and β-hydroxy alkyl amides and, if required, further customary additives, each in accordance with claim 1, in the melt at 90 to 130° C., extruding, removing, granulating, milling and sieving to a size of less than 100 μm.

8. In a method for producing coatings or protective layers by means of whirl sintering, electrostatic coating, the improvement comprising a thermosetting coating system in accordance with claim 1.

9. In a protective layer, the improvement comprising said protective layer of a thermosetting coating system in accordance with claim 1.

10. In a process for applying a powder coating, the improvement comprising applying a powder coating system according to claim 1.

11. The process according to claim 10 wherein said powder coating is applied by means of an electrostatic spraying device.

12. The process according to claim 10 wherein said powder coating is applied in accordance with a fluidized bed method.

13. A powder coating applied by the method of claim 10, including heat setting said powder coating system.

14. The coating system according to claim 1, wherein said at least 90 mol-parts of at least a further dicarboxylic acid include from about 3 to 9 mol-parts of aliphatic dicarboxylic acid.

15. The coating system according to claim 1, including from about 3 to 9 mol-parts of cyclo-aliphatic dicarboxylic acid.

* * * * *